Patented July 6, 1954

2,683,160

UNITED STATES PATENT OFFICE 2,683,160

PREPARATION OF AROMATIC ISOCYANATES

Carl F. Irwin, New Castle, Del., assignor to E. I. du Pont de Nemours and Company, Wilmington, Del., a corporation of Delaware No Drawing. Application March 19, 1953, Serial No. 343,483

8 Claims. (Cl. 260—453)

This invention relates to an improved process for preparing aromatic isocyanates by reacting together in the liquid phase the corresponding primary amine and phosgene.

It is well known in the art to prepare isocyanates from amines by reacting them, either in the free state or in the form of their salts such as the hydrochlorides, with phosgene. The overall reaction taking place may be represented as:

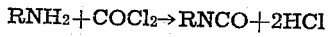

$$RNH_2 + COCl_2 \rightarrow RNCO + 2HCl$$

in which R is an organic radical. This reaction does not ordinarily proceed as straightforwardly as this representation may indicate, however, since the isocyanate which is formed may react with some of the starting amine to form substituted ureas, with consequent decrease in yield of the desired product. To avoid this, various schemes have been proposed. In one such process, the reaction is carried out in two steps, in the first of which the temperature is maintained between 0° and room temperature. During this step there is formed a carbamyl chloride together with hydrogen chloride which tends to react with any free amino groups and to protect them from side reactions. When this initial reaction is completed at low temperature, the temperature is then raised to convert the carbamyl chloride to the desired isocyanate, with further evolution of hydrogen chloride. This two-step process has the disadvantage of being slow and of requiring careful control of temperature to avoid side reactions.

It has also been proposed to modify this process involving the intermediate formation of carbamyl chloride, by carrying out the reaction between the amine or its salt and phosgene in a series of vessels each having a higher temperature than the preceding one and employing a cascade system for transporting the amine solution from one vessel to the next. At least five vessels are used in this process and yields of about 75% are obtained.

Another known method of minimizing side reactions involving the amine is to react it first with hydrogen chloride to form the amine hydrochloride and thereafter to react the hydrochloride with phosgene in the presence of a solvent. This is also a two-step process and unless special precautions are taken, the hydrochloride is in the form of a thick mass of crystals which are difficult to handle unless large amounts of solvent are employed.

It has also been proposed to carry out the reaction between the amine and phosgene in the vapor phase. This requires relatively high temperatures, which are generally accompanied by decomposition of a portion of the reactants and the isocyanate product, particularly when diamines or other polyamines are used.

It is an object of this invention to provide a process by which aromatic isocyanates may be prepared in excellent yield by a single-step liquid phase process. It is a further object to provide such a process which may be carried out continuously, semi-continuously or batchwise. A further object is to provide a process for preparing isocyanates in which smaller amounts of tarry by-products are formed than is usual in the processes known heretofore. Further objects will appear from the description of this invention which follows.

According to my invention, phosgene and a solution of an aromatic primary amine in a chlorinated aromatic hydrocarbon solvent are added simultaneously to a solution of the desired isocyanate in the said solvent, the latter solution being maintained at the boiling point under reflux at a temperature between 130° and 300° C. Hydrogen chloride and unreacted phosgene are continuously withdrawn through the reflux condenser.

The process is ordinarily carried out in a single vessel. In a representative embodiment of this invention, a small amount of solvent is placed in the reaction vessel and heated to the reflux temperature. The organic amine is dissolved in more of the same solvent and is admitted to the reaction vessel from a feed tank at the same time as gaseous phosgene from any convenient source is introduced. The mixture in the reaction vessel is preferably well agitated, and sufficient heat is supplied to maintain ebullition. The solution of the amine and the phosgene are introduced at such rates that there is at least a 50% stoichiometric excess of phosgene over that theoretically required to react with the amine. As isocyanate is formed, it dissolves in the solvent and as the reaction proceeds, the concentration of isocyanate gradually approaches a value corresponding to the concentration of the amine in its feed solution. When the amount of material in the reaction vessel reaches the limit set by the size of the vessel, the introduction of amine and phosgene is discontinued and the isocyanate product is separated from its solution by fractional distillation or by any other conventional method. In some cases it will be desirable to use the isocyanate directly in the form of a solution.

Instead of a batch process, the reaction may be carried out continuously by drawing off solution from the reaction vessel at approximately the same rate at which the amine solution is fed into the vessel. This is preferably done after the concentration of isocyanate in the vessel has built up to the equilibrium value. If preferred, isocyanate may be added to the solution at the beginning in order to reach this equilibrium value. It is also possible to operate the process semi-continuously, using a continuous flow of reactants and making periodic withdrawals of portions of the isocyanate solution. The reaction rate appears to be fairly independent of the concentration of isocyanate in the solution, so that from this standpoint, it does not matter whether the process is begun with pure solvent or with an isocyanate solution in the reaction vessel.

The solvents employed in this process are chlorinated aromatic hydrocarbons which boil at atmospheric pressure between 130° and 300° C. It is necessary that the solvent have a lower boiling point than the particular aromatic isocyanate which is to be prepared, in order that the isocyanate will remain dissolved while the solution refluxes. Representative members of this class of solvents are monochlorbenzene, o-dichlorobenzene, p-dichlorobenzene, the trichlorobenzenes, the corresponding chlorinated toluenes and xylenes, the chloroethylbenzenes, monochlorobiphenyl, and alpha- and beta-naphthyl chloride. Ortho-dichlorobenzene is a preferred solvent in this process for most isocyanates, while monochlorobenzene is particularly useful in preparing the lower boiling isocyanates. Mixtures of solvents may be used. Unchlorinated aromatic hydrocarbon solvents apparently do not dissolve enough phosgene to permit the reaction to take place rapidly. It has also been found that when an unchlorinated solvent is used, there is a tendency for substantial amounts of solid tarry material to be formed in the reaction vessel. Aliphatic solvents do not dissolve enough of the amine or of the isocyanate to permit the reaction to proceed smoothly and rapidly.

By operating at reflux temperatures, the reaction between the amine and phosgene proceeds rapidly and any carbamyl chloride which is formed as an intermediate is at once decomposed to form the isocyanate. Operation under reflux also permits easy regulation of the temperature of the reaction mass, any variation in the heat of reaction being at once compensated for by the evaporation of more or less solvent. Temperatures above 300° C. are undesirable since decomposition of the product or reactants is apt to take place, with resulting decrease in yield. Temperatures below about 130° C. are undesirable, as the reaction rate is decreased and the carbamyl chloride intermediates are less completely decomposed. As monochlorobenzene, the simplest of the chlorinated aromatic hydrocarbon solvents, boils at about 132° C., it is in any event not convenient to operate the process of this invention appreciably below this temperature. Atmospheric pressure will normally be employed as a matter of convenience, though higher or lower pressure may be used.

The amine is introduced into the reaction vessel in solution in the chlorinated aromatic hydrocarbon solvent. This solution should contain from 5 to 30% of the amine. If the concentration of the amine is much above 30%, it is not practical to get enough phosgene into solution to insure preferential reaction of the amine with the phosgene rather than with the isocyanate. Also, if the amine concentration in the solution is too high, an insoluble product of unknown composition is formed. This compound contains a large percentage of unhydrolyzable chlorine and will not decompose to give an isocyanate and hence is neither the amine hydrochloride nor a carbamyl chloride. At concentrations below 5%, the process is operable but uses uneconomically large amounts of solvent. In general it is desirable to use amine solutions containing from 5 to 20% by weight of the amine, while the preferred range is from 8 to 12% by weight. The amine solution may be preheated before its introduction into the reaction vessel. This is particularly desirable when the volume of solution added in a given time represents a substantial proportion of the volume of the boiling solution in the reaction vessel.

It is necessary to use at least a 50% stoichiometric excess of phosgene over the amount theoretically necessary for complete reaction with the amine. With smaller amounts of phosgene some of the amine reacts with the isocyanate, forming tarry deposits and lowering the yield. The preferred amount of phosgene is from 80% to 100% stoichiometric excess. The use of greater amounts does no harm except for the added expense and for the necessity of disposing of the excess. This excess of phosgene may be recovered and recycled.

Amost any primary aromatic amine may be converted to the corresponding isocyanate by this process, so long as the resulting isocyanate has a higher boiling point than monochlorobenzene, i. e., 132° C. The amine may be a monoamine, a diamine or some other polyamine. The process is applicable to amino-substituted hydrocarbons such as aniline, toluidine, benzidine, the naphthyl amines, 2,4-tolylene diamine, 2,6-tolylene diamine, the phenylene diamines, 4,4'-diamino diphenyl methane, 1,5-naphthalene diamine and 1-amino-3-(4-aminophenyl)propane, and also to compounds such as anisidine, the chloroanilines, etc. The amine should be free of groups other than the amino group which are capable of reacting with the isocyanate radical, i. e., that contain active hydrogen atoms. Such groups are, for example, —OH, —COOH, —SH, etc. Many amines which are completely inoperable or which give very low yields by prior art methods may be reacted satisfactorily by the process of this invention to give high yields of the corresponding isocyanates.

It is quite surprising that high yields are obtained when using the high temperatures of the present process in the liquid phase, since heretofore it has been thought necessary to begin the reaction at a low temperature to avoid the formation of side reaction products. It is also surprising that there is relatively little reaction between the amine and the isocyanate already formed and present in the solution. This appears to be due to the particular solvents used, the temperature at which the reaction is conducted, and to the substantial excess of phosgene which is employed.

The process of this invention is illustrated by the following representative examples:

*Example 1*

The apparatus used in this run consists of a flask fitted with an agitator, a dropping funnel whose end dips below the surface of the liquid in the flask, a thermometer, a reflux condenser, and a phosgene inlet which dips below the surface. The flask has a bottom outlet so that solution can be removed from the flask.

A stock feed solution containing 55 g. of 2,4-tolylene diamine in 652.5 g. o-dichlorobenzene is made by warming under an atmosphere of nitrogen. Into the reaction flask are placed 652.5 g. of o-dichlorobenzene which is heated to 176–180°

C. at which temperature it refluxes gently. The feed solution is then fed in at a uniform rate over a period of 3 hours, and there is simultaneously fed in 60-65 g. per hour of phosgene. Hydrogen chloride and excess phosgene are withdrawn through the reflux condenser. At intervals of about 35 or 40 minutes approximately 100 cc. portions of the reaction mass are withdrawn. The contents of the flask are then cooled, combined with the withdrawn material and filtered with a little dry filter aid to remove the small amount of solid which has formed. The o-dichlorobenzene is removed by distillation, leaving 2,4-tolylene diisocyanate in 87% yield.

*Example 2*

In the process described in Example 1 the concentration of 2,4-tolylene diisocyanate in the reaction vessel gradually increases from zero to the final concentration. The procedure of Example 1 is repeated using identical conditions except that to the starting 652.5 g. of o-dichlorobenzene in the reaction flask are added 78 g. of 2,4-tolylene diisocyanate which is equivalent to the amount of material formed from 55 g. of 2,4-tolylene diamine. The contents of the flask are heated to a gentle reflux as before and the same quantities of 2,4-tolylene diamine in o-dichlorobenzene and phosgene are added at the same rate. At the end of the run, the o-dichlorobenzene is distilled off and a 92% yield of 2,4-tolylene diisocyanate is obtained. This product analyzes 97.5% purity.

*Example 3*

The apparatus used is the same as that in Example 1. A feed solution of 197 g. of 4,4'-diamino diphenyl methane in 1435 g. of o-dichlorobenzene is prepared. To the reaction flask are added 783 g. of o-dichlorobenzene and the temperature of the solvent is adjusted to 176–180° C. The diamine feed solution is then introduced at a rate of 197 g. per hour while phosgene is passed in at a rate of 70 g. per hour. When all the material has been added, the solution is heated and degassed under a slight vacuum and then filtered. The o-dichlorobenzene is then removed by distillation and a 91% yield of methylene-bis-(4-phenyl isocyanate) is obtained.

*Example 4*

A feed solution is made up of 231 g. of 2,6-tolylene diamine in 2740 g. of o-dichlorobenzene. A reaction flask similar to that used in Example 1 is charged with 130 g. of o-dichlorobenzene and heated to 178–181° C. The feed solution is then fed to the reaction flask at a rate of 283 g. per hour while phosgene is passed in at a rate of 70 g. per hour. The addition is carried on for 3½ hours and then interrupted for an overnight period and then carried on for an additional 7 hours. A total of 231 g. of the diamine is thus added. The reaction mass is worked up as in the preceding examples and 301 g. of 2,6-tolylene diisocyanate are obtained. This represents a yield of 91.5%. The purity of the diisocyanate is found by analysis to be 99.1%.

*Example 5*

The apparatus used is the same as in the previous examples. A feed solution consisting of 90 g. of aniline in 1107 g. of monochlorobenzene is made up. The reactor is charged with 111 g. of monochlorobenzene which is heated to 129–133° C. at which temperature it refluxes gently. The feed solution is then added at a rate of 240 g. per hour while phosgene is passed in at a rate of 70 g. per hour. This is continued for 5 hours. The solution is then worked up as before by degassing and distilling off the monochlorobenzene. A yield of 111.6 g. of phenyl isocyanate is obtained which is 97% of theoretical.

A similar run is made using p-chlorotoluene instead of monochlorobenzene and a 23% concentration of aniline in the feed stock instead of 7.5%. A solution of 32 g. of aniline in 107 g. of p-chlorotoluene is added to 321 g. of p-chlorotoluene at the reflux of 162–165° C. while passing in phosgene, as above, and similar results are obtained.

*Example 6*

A mixture of o-dichlorobenzene and p-dichlorobenzene is obtained by distillation of a crude chlorinated benzene, the material distilling below 165° C. being discarded. A solution of 110 g. of 2,4-tolylene diisocyanate in 913 g. of this mixture is put into the reaction flask and heated to a gentle reflux at 167–170° C. A feed solution containing 110 g. of 2,4-tolylene diamine dissolved in 1310 g. of dichlorobenzene mixture is fed in at a rate of 237 g. per hour while phosgene is passed in at a rate of 75 g. per hour. At the end of 6 hours, 110 g. of 2,4-tolylene diamine have been fed in. The reaction product is degassed by heating under vacuum and then filtered. The dichlorobenzene is then distilled off. A yield of 254 g. of 2,4-tolylene diisocyanate is obtained which is 95% of theoretical.

*Example 7*

In an apparatus similar to that in Example 1 are placed approximately 1700 g. of o-dichlorobenzene which is heated to a gentle reflux at about 176–180° C. Into this is fed a solution of 120 g. of m-phenylene diamine in 1200 g. of o-dichlorobenzene at a rate of 330 g. per hour, while phosgene is passed in at a rate of 195 g. per hour. After all the feed has been added, the reaction mass is cooled and filtered. The o-dichlorobenzene is removed under vacuum and 123 g. of m-phenylene diisocyanate are obtained. This represents a 73% yield.

*Example 8*

Trichlorobenzene (600 g.) is heated in the reaction vessel to reflux, at about 210–215° C. and saturated with phosgene. A 7.8% solution of 2,4-tolylene diamine in trichlorobenzene is fed in simultaneously with gaseous phosgene. The reaction is carried out over a period of 10 hours, using a phosgene feed rate of 65 g. per hour and an amine solution feed rate of 325 g. per hour. Portions of the reaction mass are withdrawn from the flask periodically, approximately 300–350 g. being withdrawn every hour. Analysis of the composite trichlorobenzene solution of 2,4-tolylene diisocyanate shows a yield of 95.5% based on the 2,4-tolylene diamine fed. The diisocyanate is recovered as before by degassing and fractionation of the reaction mass under vacuum.

*Example 9*

One hundred twelve (112) grams of 1,5-diamino naphthalene are dissolved in 1600 g. of boiling isoamyl alcohol, and 160 g. of sodium are added in small portions. The solution is boiled until no more sodium remains. The solution is cooled to 100° and 750 cc. of water are added. The two layers which form are stirred vigorously with a Hershberg stirrer until the mixture has cooled to room temperature (approximately 3.5 hours). The isoamyl alcohol layer which contains the 1,5- diamino tetrahydro naphthalene is then separated from the water layer.

The alcohol layer is made just acid to litmus with concentrated HCl and the alcohol is distilled off until crystals begin to form. The residue is diluted with 1000 cc. of ethyl ether, cooled in an ice bath and wet $CO_2$ is passed in for 4 hours. The precipitate which forms is filtered off and air dried. It weighs 104 g.

The 1,5-diamino tetrahydro naphthalene carbonate thus formed is dissolved in 800 cc. of 7% acetic acid, and the resulting solution is filtered. The filtrate is placed in a 2 liter flask with 500 cc. of o-dichlorobenzene and 200 g. of 50% KOH solution. The mixture is heated and stirred vigorously. The layers are separated in a separatory funnel, and the o-dichlorobenzene layer containing the free diamine is dehydrated by boiling off some of the solvent.

The o-dichlorobenzene solution (450 cc.) of 1,5-diamino tetrahydro naphthalene is added at a uniform rate of 225 cc./hour to boiling o-dichlorobenzene into which phosgene is passing at a rate of 83 g./hour.

On cooling and filtering only a slight amount of solid is left as residue. The o-dichlorobenzene is distilled off under vacuum and 47 g. of 1,5-tetralin diisocyanate are recovered, boiling at 127–130°/1–2 mm. The distilled product is light yellow.

The process of this invention results in yields of isocyanates which in most cases are in the range from 90 to 97%. Better yields are generally obtained when the process is carried out continuously than when a batch process is used. Temperature control is much simpler with the present process, involving the use of reflux temperatures, than in prior art processes.

The advantages of the present process over prior art vapor phase processes are quite marked. The temperatures used in this process are considerably lower and as a result there is less decomposition of the reactants and of the isocyanate. This results in higher yields of isocyanate and smaller amounts of unusable and undesirable tarry materials which accumulate in the vapor phase methods. Some isocyanates which cannot be prepared in the vapor phase, such as methylene-bis-(4-phenyl isocyanate), can be made in good yield by the present process. This compound can be prepared by prior art liquid phase methods in 75% yield, while by the present process, yields of 90% are readily obtainable.

As compared with previously known liquid phase methods of carrying out the reaction between phosgene and primary amines, the present process gives improved yields, requires smaller equipment for a given rate of production, permits easier temperature control, and eliminates one separate operation (the formation of the amine hydrochloride or the carbamyl chloride).

I claim:

1. In the preparation of an aromatic isocyanate boiling above 132° C., the steps which comprise maintaining at the boiling point under reflux at a temperature between 130° and 300° C. a solution of the said isocyanate in a chlorinated aromatic hydrocarbon solvent having a boiling point at atmospheric pressure within the said temperature range and below the boiling point of the said isocyanate, adding simultaneously thereto (1) a 5 to 30% by weight solution of the aromatic primary amine which corresponds to the said isocyanate dissolved in the said solvent and (2) phosgene in at least 50% stoichiometric excess in relation to the amine, and withdrawing hydrogen chloride and unreacted phosgene through the reflux condenser.

2. The process of claim 1 in which the aromatic primary amine is a diamine.

3. The process of claim 1 in which the aromatic primary amine is 2,4-tolylene diamine.

4. The process of claim 1 in which the aromatic primary amine is 4,4'-diamino diphenyl methane.

5. In the preparation of 2,4-tolylene diisocyanate, the steps which comprise maintaining at the boiling point under reflux a solution of the said diisocyanate in o-dichlorobenzene, adding simultaneously thereto (1) a 5 to 30% by weight solution of 2,4-tolylene diamine dissolved in o-dichlorobenzene and (2) phosgene in at least 50% stoichiometric excess in relation to the diamine, and withdrawing hydrogen chloride and unreacted phosgene through the reflux condenser.

6. In the preparation of phenyl isocyanate, the steps which comprise maintaining at the boiling point under reflux a solution of phenyl isocyanate in monochlorobenzene, adding simultaneously thereto (1) a 5 to 30% by weight solution of aniline dissolved in monochlorobenzene and (2) phosgene in at least 50% stoichiometric excess in relation to the aniline, and withdrawing hydrogen chloride and unreacted phosgene through the reflux condenser.

7. The process of preparing an aromatic isocyanate boiling above 132° C. which comprises heating to the boiling point a chlorinated aromatic hydrocarbon solvent having a boiling point lower than that of the said isocyanate and between 130° and 300° C. at atmospheric pressure, maintaining the said solvent at the boiling point under reflux while adding simultaneously thereto (1) a 5 to 30% by weight solution of the aromatic primary amine which corresponds to the said isocyanate dissolved in the said chlorinated aromatic hydrocarbon solvent and (2) phosgene in at least 50% stoichiometric excess in relation to the amine and withdrawing hydrogen chloride and unreacted phosgene through the reflux condenser, thereby producing a solution of the said isocyanate in the chlorinated aromatic hydrocarbon solvent, and thereafter separating the isocyanate from the solution.

8. A process for preparing an aromatic isocyanate boiling above 132° C. which comprises maintaining in a reaction zone at the boiling point under reflux at a temperature between 130° and 300° C. a solution of the said isocyanate in a chlorinated aromatic hydrocarbon solvent having a boiling point at atmospheric pressure within the said temperature range and below the said boiling point of the isocyanate, continuously and simultaneously adding thereto (1) a 5 to 30% by weight solution of the aromatic primary amine which corresponds to the said isocyanate dissolved in the said chlorinated aromatic solvent and (2) phosgene in at least 50% stoichiometric excess in relation to the amine, continuously withdrawing hydrogen chloride and unreacted phosgene through the reflux condenser, continuously withdrawing a portion of the isocyanate solution from the reaction zone, and separating the said isocyanate from the said portion of solution.

References Cited in the file of this patent

UNITED STATES PATENTS

| Number | Name | Date |
|---|---|---|
| 2,326,501 | Siefken et al. | Aug. 10, 1943 |
| 2,374,340 | Farlow | Apr. 24, 1945 |
| 2,642,449 | Morningstar et al. | June 16, 1953 |